United States Patent Office 3,433,000
Patented Mar. 18, 1969

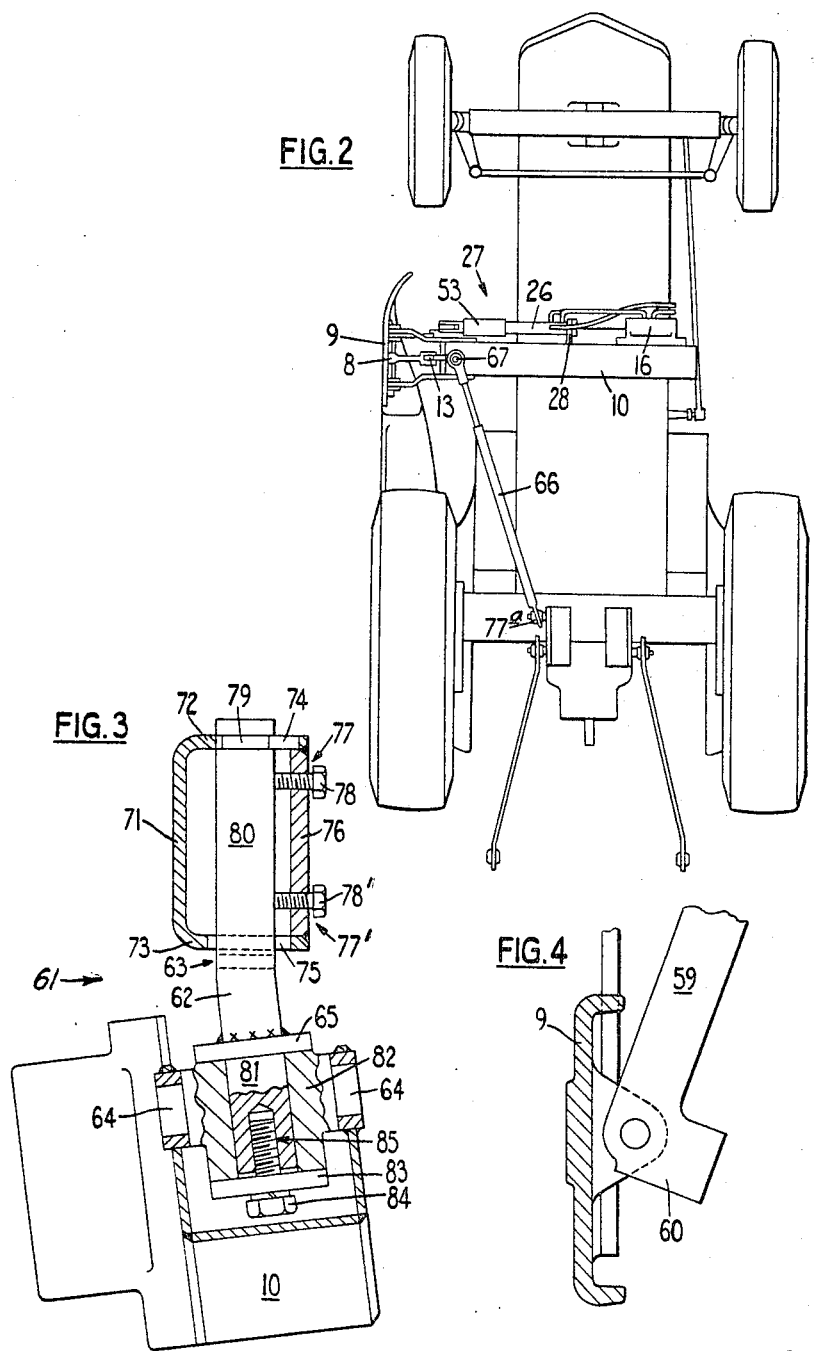

3,433,000
THREE POINT INDEPENDENTLY CONTROLLED MOWER FRAME MOUNTING
James N. Brade, Churchtown, Southport, England, assignor to Harrison, McGregor and Guest Limited
Filed Oct. 22, 1965, Ser. No. 501,115
Claims priority, application Great Britain, Oct. 29, 1964, 44,083/64
U.S. Cl. 56—25          8 Claims
Int. Cl. A01d 35/02, 55/32

ABSTRACT OF THE DISCLOSURE

A mowing machine of the reciprocating knife-bar type for mounting in transverse relation at the forward end of a tractor comprises a knife-bar frame and three independent means flexibly attached to three spaced points on said frame for mounting the frame on the tractor, these points being disposed at the respective apices of a triangle, and each of the independent means being operative to independently control the position of the frame relative to the tractor.

---

The invention related to mowing machines of the reciprocating knife-bar type for mounting on agricultural tractors.

The object of the invention is to provide simple means for mid-mounting such a machine on a tractor.

According to the invention, a mowing machine of the reciprocating knife-bar type is adapted to be mid-mounted on a tractor at three points of attachment disposed at the respective apices of a triangle. Preferably, the points of attachment comprise respective ends of a pitch control means, a strut or tie, and a chain. Preferably, also the chain forms part of a hydraulically actuated mechanism for raising the machine into inoperative position. The strut or tie is preferably telescopic and collapsible under overload.

A preferred embodiment of the invention will now be described, by way of example only, with reference to the accompanying drawings, of which:

FIG. 2 is a view, on a smaller scale, on the underside of the mowing machine and tractor;

FIG. 3 is a sectional elevation, on a larger scale, of pitch control means for the mowing machine; and FIG. 4 is a front elevation, also on a larger scale, of a lever mechanism on the mowing machine.

Figure 1:
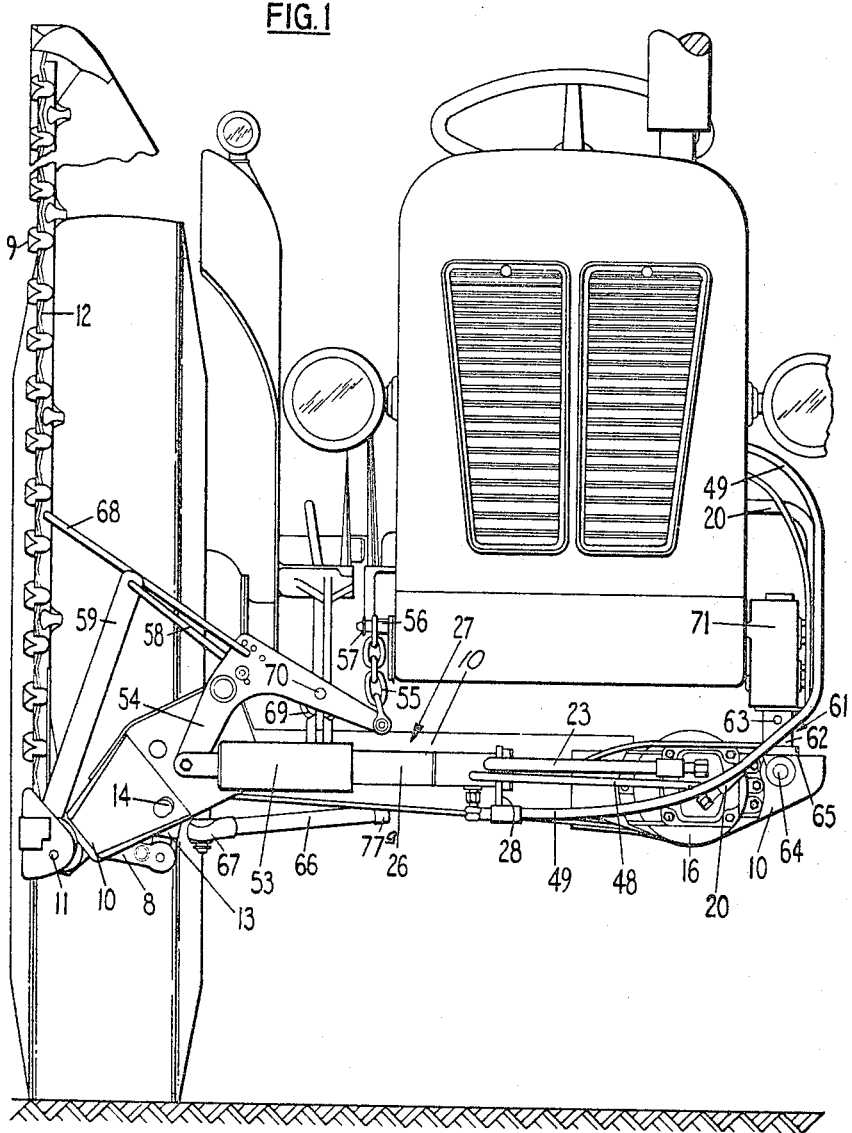
FIG. 1 is a front elevation of a mowing machine mounted in transport position on a tractor, parts of the tractor, notably the front axle and front wheels, having been omitted for clarity.

Referring now to the drawings, a mowing machine for mid-mounting on an agricultural tractor comprises a conventional knife-bar 12 reciprocable on a bed 9 pivotally connected to a frame 10 about an axis 11. The knife-bar 12 is driven via a connecting rod 8 by an oscillating lever 13 pivotally mounted on an axle 14 rigidly secured to the frame 10. The lever 13 is driven via a pitman (not shown) by a gear-type hydraulic motor 16 rigidly secured to the frame 10. The frame 10 of the mowing machine is adapted to be attached to the tractor at three points disposed at the respective apices of an imaginary triangle.

The first point of attachment of the frame 10 to the tractor is formed by pitch control means (indicated generally at 61) for the mowing machine. Said means comprise a length of round bar 62 (see FIG. 3) having an upper portion 80 and a lower portion 81 with mutually inclined intersecting axes. The upper portion 80 is adapted to be clamped, with its axis generally vertical, to a bracket 71 secured rigidly to the tractor, and the lower portion 81 is adapted to be pivotally connected to the frame 10. The bracket 71 has two vertically spaced flanges 72 and 73 having respective square holes 74 and 75 formed therein between which a plate 76 provided with two threaded holes 77, 77' is welded. An annular groove 79 formed in the upper portion 80 of the bar 62 engages two edges of the upper hole 74 to locate the bar 62 endwise whilst two setscrews 78, 78' engaging the threaded holes 77, 77' provide the clamping force. The lower portion 81 of the bar 62 pivotally supports a sleeve 82 provided with trunnions 64 which engage aligned holes in the frame 10. The sleeve 82 is clamped lightly against a collar 65 welded onto the lower portion 81 by a washer 83 carried on a setscrew 84 which engages a threaded hole 85 formed in the lower end of the bar 62. A diametrical hole 63 is provided in the bar 62 in which a rod can be inserted to rotate said bar relative to the bracket 71 when the setscrews 78, 78' are slackened. The included angle between the axes of the upper and lower portions 80 and 81 of the bar 62 is, say, 173 degrees. Thus the frame 10 and the knife bed 9 can be inclined at an angle of attack of up to 7 degrees above or below the horizontal by rotatable adjustment of the length of round bar 62.

The second point of attachment of the frame 10 to the tractor is formed by a telescopic strut 66 (see FIG. 2) connected to said frame by means of a ball joint 67 and adapted to be connected by means of a ball joint 77a to the tractor rear axle casing. The strut 66 is adapted to collapse if the mowing machine meets with an obstruction or other overload.

The third point of attachment of the frame 10 to the tractor is formed by a short length of chain 55 (see FIG. 1), the upper end of which is removably secured to a stud 56 on the tractor by a linchpin 57, and the lower end of which is pivotally connected to one arm of a bell-crank lever 54 pivotally mounted on said frame. The other arm of the bell-crank lever 54 is pivotally connected to the cylinder 53 of a hydraulic jack (indicated generally at 27), the ram 26 of which is pivotally connected to a bracket 28 welded onto the frame 10. A single chain link 69 pivotally mounted on the frame 10 is placed over a pin 70 rigidly secured to the bell-crank lever 54 to hold said frame in the transport position shown in FIG. 1. The bell-crank lever 54 is also connected by a link 58 to a lever 59 pivotally mounted on the knife bed 9. The lever 59 is formed integrally with a foot 60 (see FIG. 4) which engages the knife bed 9 when said lever is at right to locate the bar 62 endwise while two setscrews 78, 78' engaging clockwise relative to the frame 10 between the transport position shown in FIG. 1, where it is held by a quickly detachable stay 68, and its working position at right angles to the lever 59.

As shown in FIG. 1, the hydraulic motor 16 and the hydraulic jack 27 are connected to one another by conduits 23 and 48, and to a conventional hydraulic pump on the tractor by conduits 20 and 49. The complete hydraulic system is described in detail in our co-pending application for Patent No. 411,481, now matured into U.S. Letters Patent No. 3,374,610 dated Mar. 26, 1968.

To put the mowing machine into operation, the stay 68 is removed and the knife-bar 9 is lowered manually until it engages the foot 60 on the lever 59. The hydraulic system is then conditioned to cause the motor 16 to drive the knife-bar 12 and the jack 27 to extend sufficiently to release the single chain link 69 from the pin 70. The jack 27 is then caused to retract and the frame 10 pivots in an anti-clockwise direction about the trunnions 64 as viewed in FIG. 1. Simultaneously, the knife bed 9 pivots anti-clockwise about the axis 11, as viewed in FIG. 1, reaching a horizontal position as it engages the ground. The jack 27 is caused to extend whenever it is necessary to raise the knife bed 9 and the frame 10 relative to the ground. The angular movement of the knife bed 9 relative to the frame 10 caused by extension and retraction of the jack 27 is, say, 10 degrees. When the mowing machine is to be transported the knife bed 9 and the frame 10 are raised, by extending the jack 27, and the single chain link 69 is placed over the pin 70. The hydraulic system is then conditioned to cause the motor 16 to stop driving the knife-bar 12. The knife bed 9 is then raised manually into the transport position and the stay 68 is replaced.

What I claim is:

1. A mid-mounted mowing machine comprising a frame, a reciprocating knife-bar carried by said frame, and three spaced points on said frame for its attachment to a tractor, said points being disposed at the respective apices of a triangle and means at each point for independently controlling the position of the frame relative to the tractor.

2. A mid-mounted mowing machine according to claim 1, wherein said means at said three points consist respectively of a pitch control means, a strut and a flexible chain.

3. A mid-mounted mowing machine comprising a frame, a hydraulically actuated mechanism on said frame, a reciprocating knife-bar carried by said frame, and three spaced points on said frame for its attachment to a tractor, said points being disposed at the respective apices of a triangle and means at each point to independently control the position of the frame relative to the tractor, said means at said points consisting respectively of an adjustable pitch control means, a strut and a flexible chain connected to said mechanism for raising the machine into inoperative position upon actuation of said mechanism.

4. A mid-mounted mowing machine comprising a frame, a reciprocating knife-bar carried by said frame, and three spaced points on said frame for its attachment to a tractor, said points being disposed at the respective apices of a triangle and means at each point to independently control the position of the frame relative to the tractor, said means at said points consisting respectively of a pitch control means, a strut which is telescopic and collapsible under overload and a flexible chain.

5. A mowing machine of the reciprocating knife-bar type for mounting in transverse relation at the forward end of a tractor comprising a frame on which said knife-bar is mounted and there being three independent means flexibly attached to three spaced points on said frame for mounting said frame on the tractor, said points being disposed at the respective apices of a triangle, and each of said independent means being operative to independently control the position of said frame relative to said tractor.

6. The mowing machine defined in claim 5 wherein one said independent means comprises a pivotal connection to said frame and embodies means adjustable for varying the pitch of said knife-bar when the knife-bar is in operative position.

7. The mowing machine defined in claim 5, wherein one of said means comprises a telescopic strut universally connected at opposite ends to said frame and the tractor.

8. The mowing machine defined in claim 5, wherein one of said means comprises a bell crank lever pivoted on the frame with one end operably connected to a hydraulic operator on the frame and the other end connected to the tractor by a flexible suspension link.

References Cited
UNITED STATES PATENTS

| | | | |
|---|---|---|---|
| 2,502,805 | 4/1950 | Spurlin | 56—25 |
| 2,518,317 | 8/1950 | Hilblom | 56—25 |
| 2,617,242 | 11/1952 | Iverson | 56—25 |
| 2,684,564 | 7/1954 | Schroeppel | 56—25 |
| 2,699,025 | 1/1955 | Goss | 56—25 |
| 2,729,044 | 1/1956 | Dunn et al. | 56—25 |
| 2,853,843 | 9/1958 | Elfes et al. | 56—25 |
| 2,880,562 | 4/1959 | Vutz | 56—25 |
| 3,139,719 | 7/1964 | Pflucke et al. | 56—25 |

ALDRICH F. MEDBERY, *Primary Examiner.*

U.S. Cl. X.R.

56—288